United States Patent [19]

Tannehill

[11] 4,396,504
[45] Aug. 2, 1983

[54] MOBILE WASTE OIL CLEANING APPARATUS

[76] Inventor: Wilford D. Tannehill, 12214 Beamer Rd., Houston, Tex. 77089

[21] Appl. No.: 347,117

[22] Filed: Feb. 9, 1982

[51] Int. Cl.³ .......................................... B01D 21/10
[52] U.S. Cl. ..................... 210/86; 210/180; 210/181; 210/187; 210/305; 210/307; 210/313; 210/522; 210/535; 210/188
[58] Field of Search ................ 210/86, 104, 180, 181, 210/187, 207, 208, 241, 305, 307, 312, 313, 320, 522, 535, 537, DIG. 5; 208/187, 188

[56] References Cited

U.S. PATENT DOCUMENTS

| | | | |
|---|---|---|---|
| 801,679 | 10/1905 | Niclausse | 210/522 |
| 1,116,903 | 11/1914 | McClintock | 210/532.1 X |
| 1,236,746 | 8/1917 | Nonnenbruch | 210/207 |
| 1,641,843 | 9/1927 | Fisher | 210/520 X |
| 1,921,689 | 8/1933 | Meurk | 210/86 |
| 2,257,244 | 9/1941 | Oehler | 210/187 X |
| 2,345,426 | 3/1944 | Pruiett et al. | 210/532.1 X |
| 2,693,880 | 11/1954 | Schoenfeld | 210/187 |
| 2,782,929 | 2/1957 | Colket | 210/520 X |
| 2,817,440 | 12/1957 | Casner et al. | 210/521 X |
| 3,318,448 | 5/1967 | Fryer | 210/537 |
| 3,804,252 | 4/1974 | Rishel | 210/532.1 X |
| 3,844,944 | 10/1974 | Mercuri | 210/800 |
| 4,040,961 | 8/1977 | Davis, Jr. et al. | 210/522 X |
| 4,048,070 | 9/1977 | Propp | 210/522 X |
| 4,111,805 | 9/1978 | Van Pool et al. | 210/522 X |
| 4,132,645 | 1/1979 | Bottomley et al. | 210/320 X |
| 4,153,553 | 5/1979 | Davis | 210/167 X |
| 4,247,312 | 1/1981 | Thakur et al. | 210/522 X |

Primary Examiner—David R. Sadowski
Attorney, Agent, or Firm—Sughrue, Mion, Zinn, Macpeak and Seas

[57] ABSTRACT

A tractor trailer chassis compactly mounts a waste oil cleaning apparatus of hydraulically connected, primary components. A diesel fuel burner fired heater of vertical cylindrical form mounts at one end of the chassis. A blower feeds a large volume of air under pressure to a cylindrical fire box where a fuel air mixture is ignited and fed tangentially into the base of the central chamber within the heater where the products of combustion follow a helical path within the central heat exchange chamber. Waste oil is fed counterflow along a second helical path through an annular chamber separated by a cylindrical metal heat conductive wall from the chamber bearing the products of combustion. Heated waste oil is fed from the heater to a vibrating table type solids separator or shaker mounted at the opposite end of the trailer chassis from the heater where solids are separated from the heated waste oil. An elongated oil/water separator tank extends the major length of the trailer chassis and is positioned between the heater and the solids separator. The waste oil with solids removed is discharged under gravity flow into the first upstream compartment of the oil/water separator. Vertical transverse walls within the separator tank define weirs of decreasing height to insure water separation from the oil prior to oil flow to the last compartment remote from the solids separator. Water collecting within the separator tank compartments is fed through parallel feed pipes to a common manifold.

9 Claims, 15 Drawing Figures

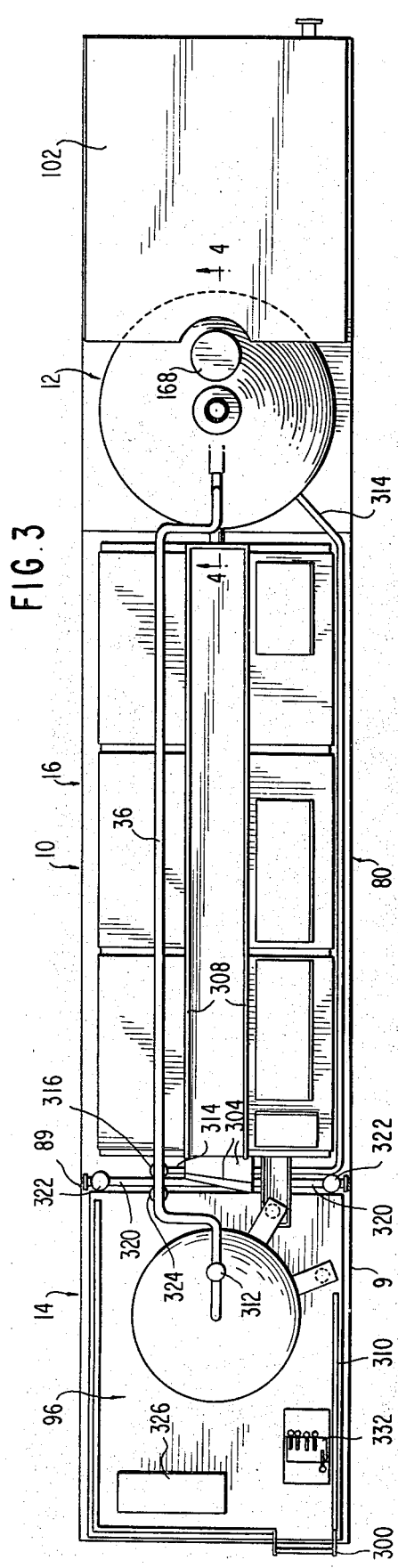
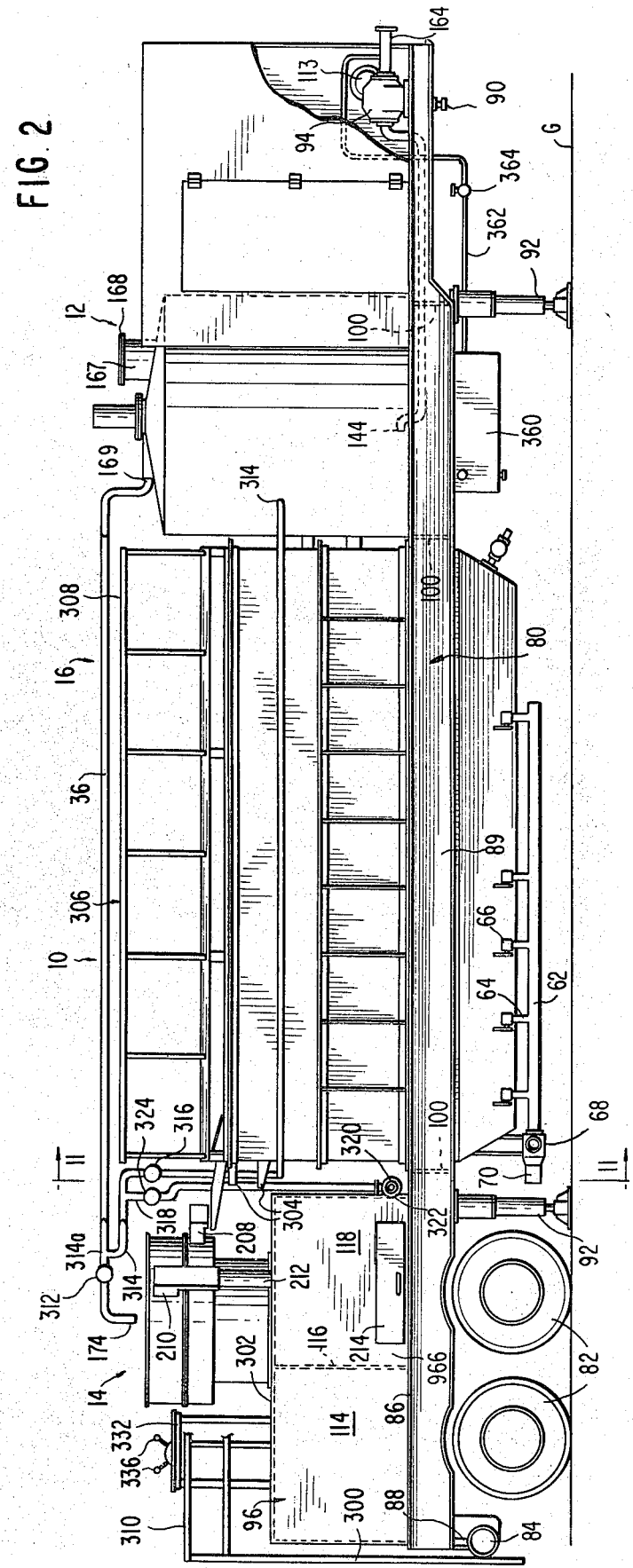

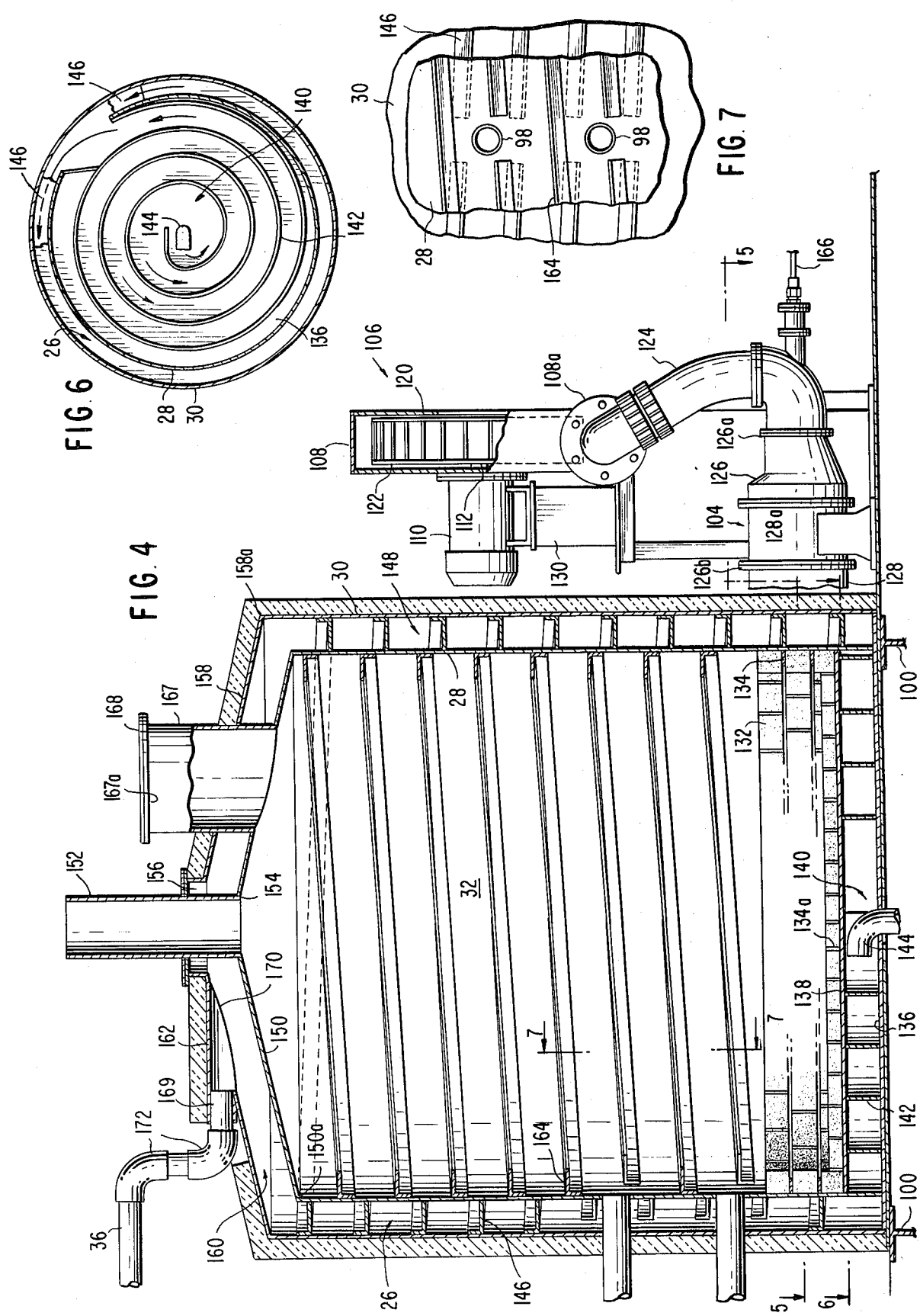

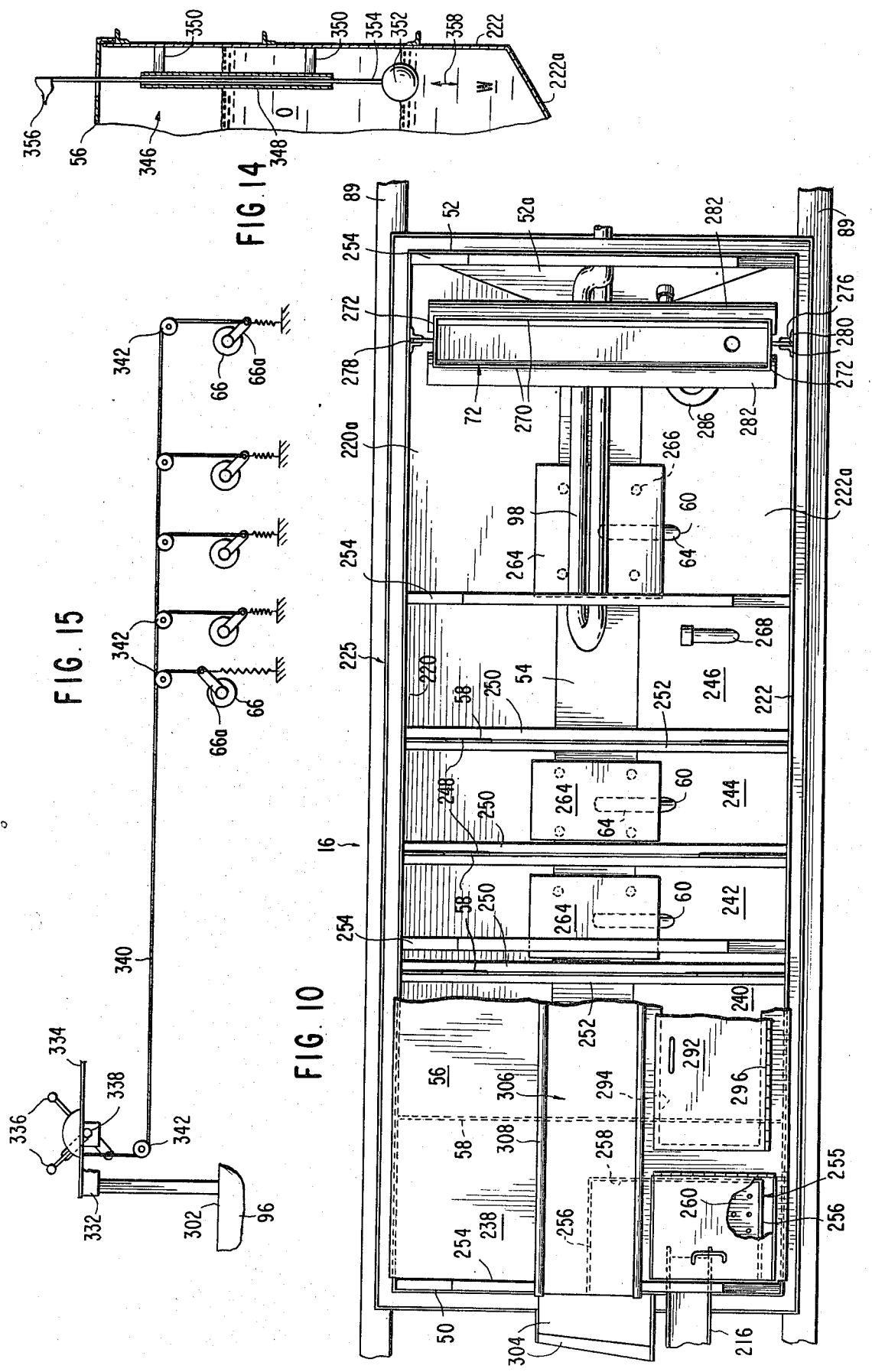

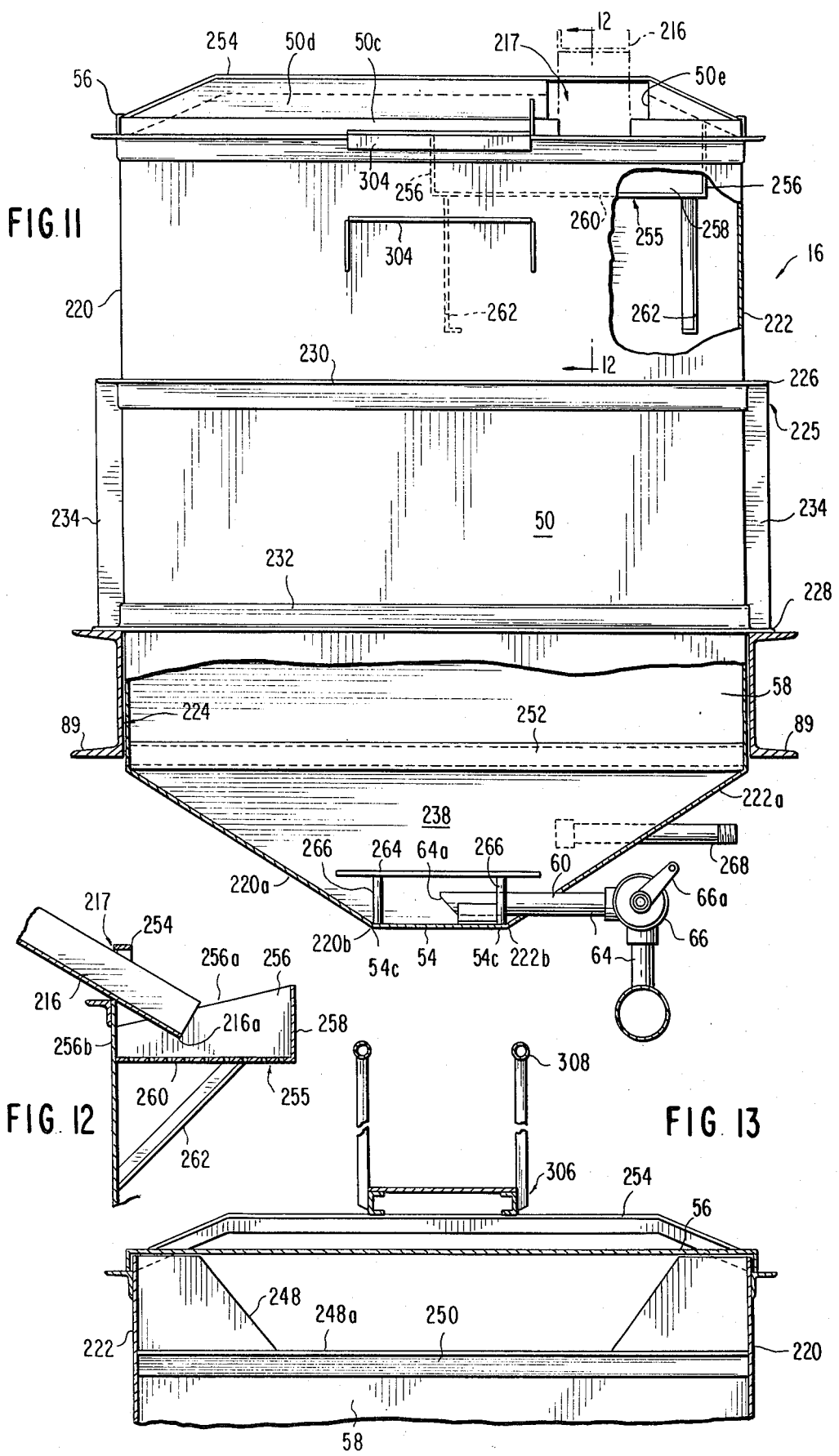

MOBILE WASTE OIL CLEANING APPARATUS

FIELD OF THE INVENTION

This invention relates to the cleaning or recovery of oil from waste oil deposits at oil fields, refineries, oil storage tank farms, and the like, and more particularly to a trailer chassis mounted compact waste oil cleaning apparatus for ready movement from site to site.

BACKGROUND OF THE INVENTION

With the large increase in the cost of oil and the apparent shortage of petroleum reserves, it has become increasingly feasible, economically, to recover as much lost oil as possible in the vicinity of oil drilling operations, oil refineries, oil storage tank farms and even oil spills at sea. Such oil, known as waste oil, contains large amounts of water or liquids other than oil and may have certain solids content.

In attempts to separate the usable oil from the contaminants, such waste oil has been pumped to accumulating tanks in the field, where due to specific gravity difference, the oil suitable for recovery use rises to the surface with water and higher density liquids seeking the bottom of such tanks. Such gravity separation systems take considerable time and do not take into account the existence of solids. In many cases, the separating action is hampered because of atmospheric conditions, that is, the oil itself is highly viscous at low temperatures.

Even where attempts have been made to increase the temperature of the waste oil to reduce viscosity, these recovery apparatus have been inefficient, incorrectly sized, and have had limited use due to the fixed nature of the apparatus involved.

It is, therefore, a primary object of the present invention to provide an improved compact waste oil cleaning apparatus which may be readily transported from site to site, which effectively removes both the solids and water from the waste oil and permits ready discharge of the separated and cleaned oil directly into fixed storage tanks, tractor trailer mounted transport tanks or rail tank cars.

It is a further object of this invention to provide such apparatus which is completely and wholly trailer mounted and self operated, and wherein the waste oil from a containment pond at a storage tank locale, oil refinery or well site, may be initially heated by circulating the waste oil between a fuel burner fired heat exchanger on the trailer chassis and the pond to raise the pond waste oil temperature sufficiently to permit flow through the waste oil cleaning apparatus with efficient, high rate separation of the solids and water from the oil.

SUMMARY OF THE INVENTION

A compact waste oil cleaning apparatus comprises an elongated horizontal platform. An oil fuel burner fired heater of vertical cylindrical form is fixed to the platform with its axis, vertical thereto. The heater comprises concentric inner and outer vertical metal walls defining a central chamber internally of the inner wall and an annular chamber between the walls. Means define helical heat exchange paths within the chambers along both surfaces of the inner wall. A combustion chamber opens up tangentially to the inner chamber at its bottom. Means supply a fuel and air mixture to the burner for combustion within the burner. The products of combustion flow through one helical path for exhaust through the top of the inner chamber via stack means. Means are provided for pumping the waste fuel through the other helical path within the annular chamber. A solids separator or shaker is mounted on the platform to one side of the heater. Pipes feed oil heated by the heater to the solids separator. A multi-compartment oil/water separator tank is mounted adjacent to the solids separator. Gravity feeding means feeds the heated waste oil, free of solids, from the solids separator to the oil/water separator. A plurality of vertical transverse walls are positioned within the oil/water separator tank with openings therein defining weirs of decreasing height from the end adjacent the solids separator to the opposite end. Water separated by gravity from the oil accummulates at the bottom of the oil/water separator tank compartments, and oil flows over the tops of the vertical oil/water separator walls towards the downstream compartment, remote from the solids separator. Means selectively remove accumulated water from the bottom of the tank and oil from the downstream oil/water separator compartment.

Preferably, the apparatus includes means for supplying a chemical additive to the waste oil prior to entry into the annular chamber forming of the heater to increase the specific gravity component of the water to facilitate gravity separation of heated oil from the water within the oil/water separator tank.

Preferably, the oil burner fired heater is mounted at one end of the horizontal platform with the solids separator mounted at the other end of the platform. The elongated oil/water separator tank is interposed between the oil burner fired heater and the solids separator, and the oil burner fired heater includes a reheat pipe in loop form projecting from the heater central chamber into the separator tank to facilitate start up, and to maintain the desired temperature of the waste oil after separation of solids and water and prior to removal of separated oil from the oil/water separator tank.

Preferably, the elongated horizontal platform comprises a tractor trailer chassis. A rectangular solids storage and/or diesel fuel storage tank is mounted to the end of the platform bearing the solids separator, beneath the solids separator. The elongated oil/water separator tank is of modified parallelepiped form having a flat top wall extending horizontally, the major length of the platform. A catwalk extends the length of the oil/water separator tank, across the top wall of the same, and to one side thereof. Openings are provided to the top wall of the separator tank to the side of the catwalk, overlying specific compartments within the tank and hinged lids cover the openings and are accessible from the catwalk.

The oil/water separator tank comprises laterally spaced vertical sidewalls. The horizontal top wall spans across the top of the vertical sidewalls. A bottom wall narrower than the top wall extends parallel thereto, and the sidewalls at their bottoms include inwardly inclined portions joined to the lateral side edges of the bottom wall along the length of the same. The transverse vertical separator walls within the oil/water separator tank include trapezoidal openings within the upper ends along the top center of the walls forming said weirs of different vertical height which decrease in a downstream direction from the end of the oil/water separator tank proximate to the solids separator towards the end remote therefrom. Holes are formed within the bottom wall of the oil/water separator tank at the center of each compartment, and a flat vortex prevention plate is mounted horizontally above and overlying each outlet hole and is spaced vertically from the bottom wall to insure indirect water flow out of the bottom of the oil/water separator tank at the hole locations. Branch pipes lead from the water outlet holes to a horizontal water manifold pipe running the length of the oil/water separator tank and beneath and to one side thereof. A water pump may be incorporated within the water manifold pipe to permit pump removal of the water from the bottom of the compartments upon sufficient accumulation thereof. Spherical floats fixed to the bottom of rods residing within the individual compartments bear flags at their upper ends which project outwardly from the top wall of the oil/water separator tank. Upon sufficient accumulation of water within the bottom of a given compartment, its flag projects and is exposed to indicate the necessity for removal of the water from the compartment. Manually operated valves are provided within the branch pipes leading to the water manifold pipe, and the valves are linked cablewise with valve actuators on a stand mounted to the solids storage and/or diesel fuel storage tank bearing the solids separator and to one side of the solids separator. The operator may selectively actuate the valves to permit pumping of water through the manifold pipe from one or more of the compartments of the oil/water separator tank.

Preferably, in the most downstream compartment in the oil/water separator tank, a skimmer is mounted for vertical movement so as to follow the level of oil accumulating within that compartment and functioning to skim off the very upper volume of oil within that compartment. A flexible hose open at one end to the interior of the skimmer is connected at its opposite end via a fitting to a wall of the tank which functions as the clean oil outlet after separation.

The oil fuel burner fired heater comprises a cylindrical metal tank. The inner metal cylindrical vertical sidewall is raised from a bottom wall of the tank to form with a false bottom therewith. A horizontal spiral oil flow passage is defined by a vertical spiral baffle. This horizontal compartment of circular form opens at its periphery to a vertical annular chamber formed intermediate of the outer and inner cylindrical sidewalls. The annular compartment includes a helical strip of L-shaped cross-section defining the helical flow path for the oil within the annular chamber. Near the top of the heater, the inner vertical cylindrical sidewall terminates at some height below that of the outer cylindrical sidewall. Inclined top walls from both sidewalls and vertically spaced from each other form an inclined oil flow path towards the axis of the chamber and near or at the top end thereof. The products of combustion within the inner chamber exit through a vertical stack or flue projecting upwardly at the axis of the heat exchanger. A horizontal axis cylindrical burner connects to the heater, projecting through the outer sidewall and opens tangentially into the inner chamber. The hot products of combustion follow a helical baffle strip carried along the inner surface of the inner wall to facilitate a companion helical flow of the products of combustion to that of the oil passing upwardly along a helical path within the annular chamber of the heater. Fire brick covers the false bottom of the heater and extends vertically along a portion of the interior of the inner cylindrical sidewall in the area where combustion is effected within the inner chamber of the heater itself.

A diesel engine driven pump may be mounted on the platform, adjacent the fuel burner fired heater for pumping oil through the apparatus, up to the entrance of the solids separator. An electric motor driven blower directs air from a cylindrical blower outlet into the leading end of a similar sized cylindrical fire chamber forming a burner whose downstream end opens directly into the heater inner chamber at the bottom thereof.

The trailer mounted apparatus may include sufficient piping with manually or remotely operated valves for selective flow of waste oil in loop form to and from the pond or, alternatively, from the pond through the fuel burner fired heat exchanger, the solids separator and the oil/water separator, depending upon the viscosity of pond waste oil available to the waste oil cleaning apparatus.

BRIEF DESCRIPTION OF THE DRAWINGS

FIG. 2 is a side elevational view of a trailer mounted waste oil cleaning apparatus forming a preferred embodiment of the present invention.

FIG. 3 is a top plan view of the apparatus of FIG. 2.

FIG. 4 is a vertical section of oil fuel burner fired heater forming a principal component of the apparatus of the present invention, taken about line 4—4 of FIG. 3.

FIGS. 5 and 6 are horizontal sectional views of the heater of FIG. 4, taken about line 5—5 and 6—6, respectively.

FIG. 7 is a fragmentary view of the inside of the heater of FIG. 4 taken in the direction of arrows 7—7.

FIG. 10 is a top plan view, with parts broken away of the separator of FIG. 9.

FIG. 11 is an end view, with parts broken away, of the separator of FIG. 9.

FIG. 12 is a fragmentary vertical sectional view of the separator taken about line 12—12 of FIG. 11.

FIG. 13 is a fragmentary vertical sectional view of another portion of the separator taken about line 13—13 of FIG. 9.

FIG. 14 is another fragmentary vertical sectional view of the separator illustrating a water accumulation indicator.

FIG. 15 is a schematic view illustrating means for controlling the valves effecting the removal of water from the oil/water separator of FIG. 9.

DESCRIPTION OF THE PREFERRED EMBODIMENT

Figure 1:
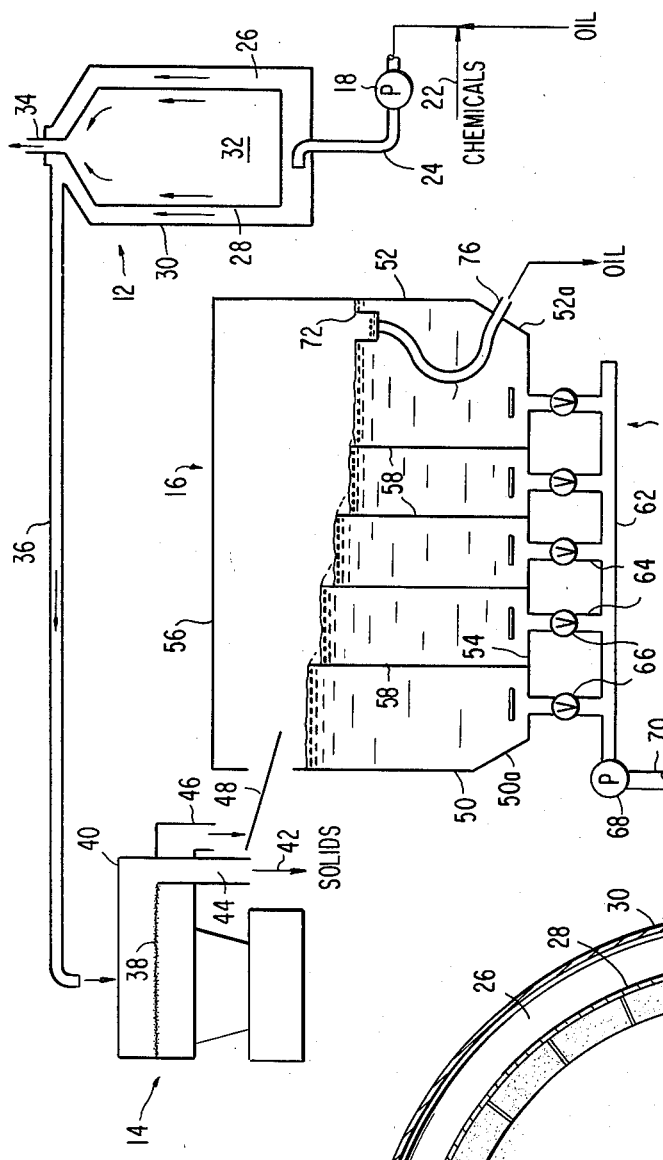
FIG. 1 is a schematic flow diagram for the compact waste oil cleaning apparatus of the present invention.
Figure 5:
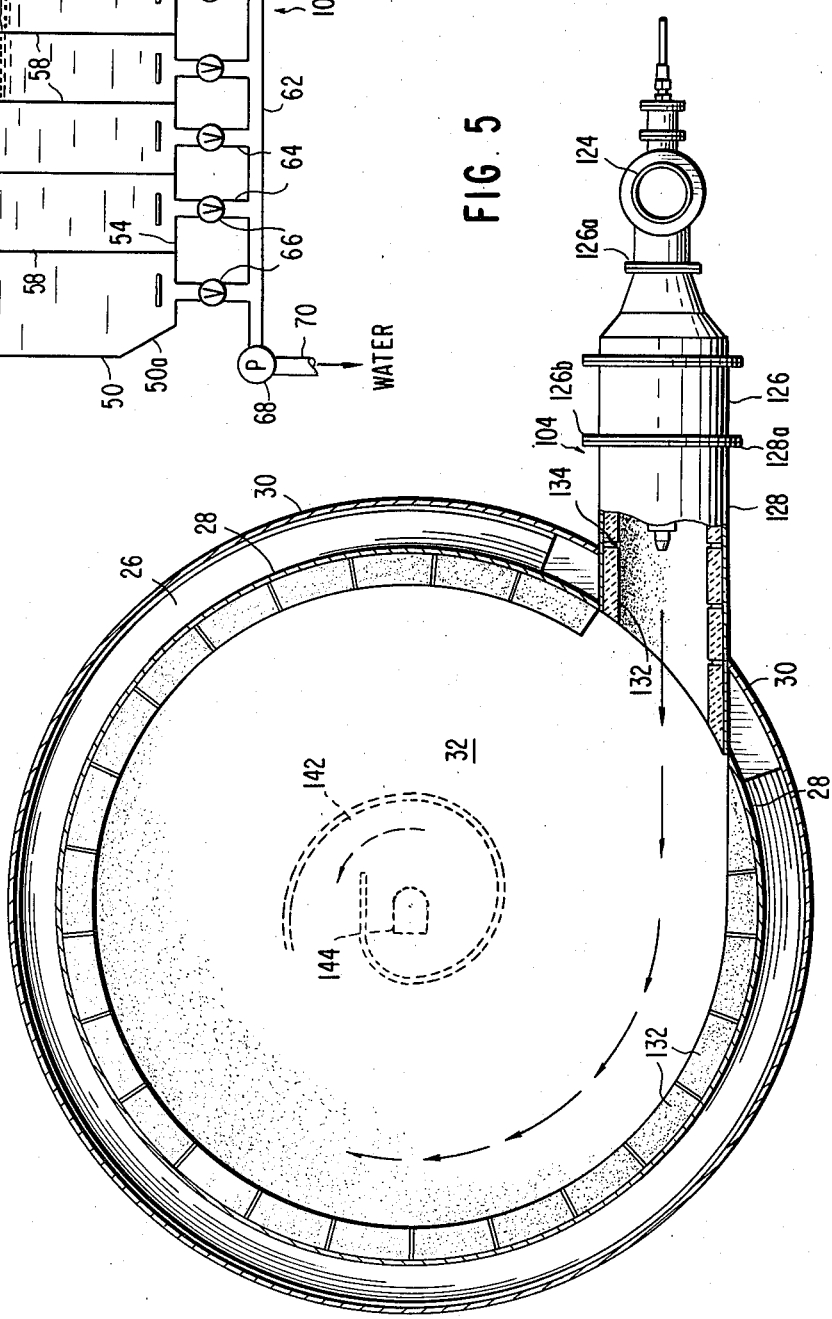
Figure 8:
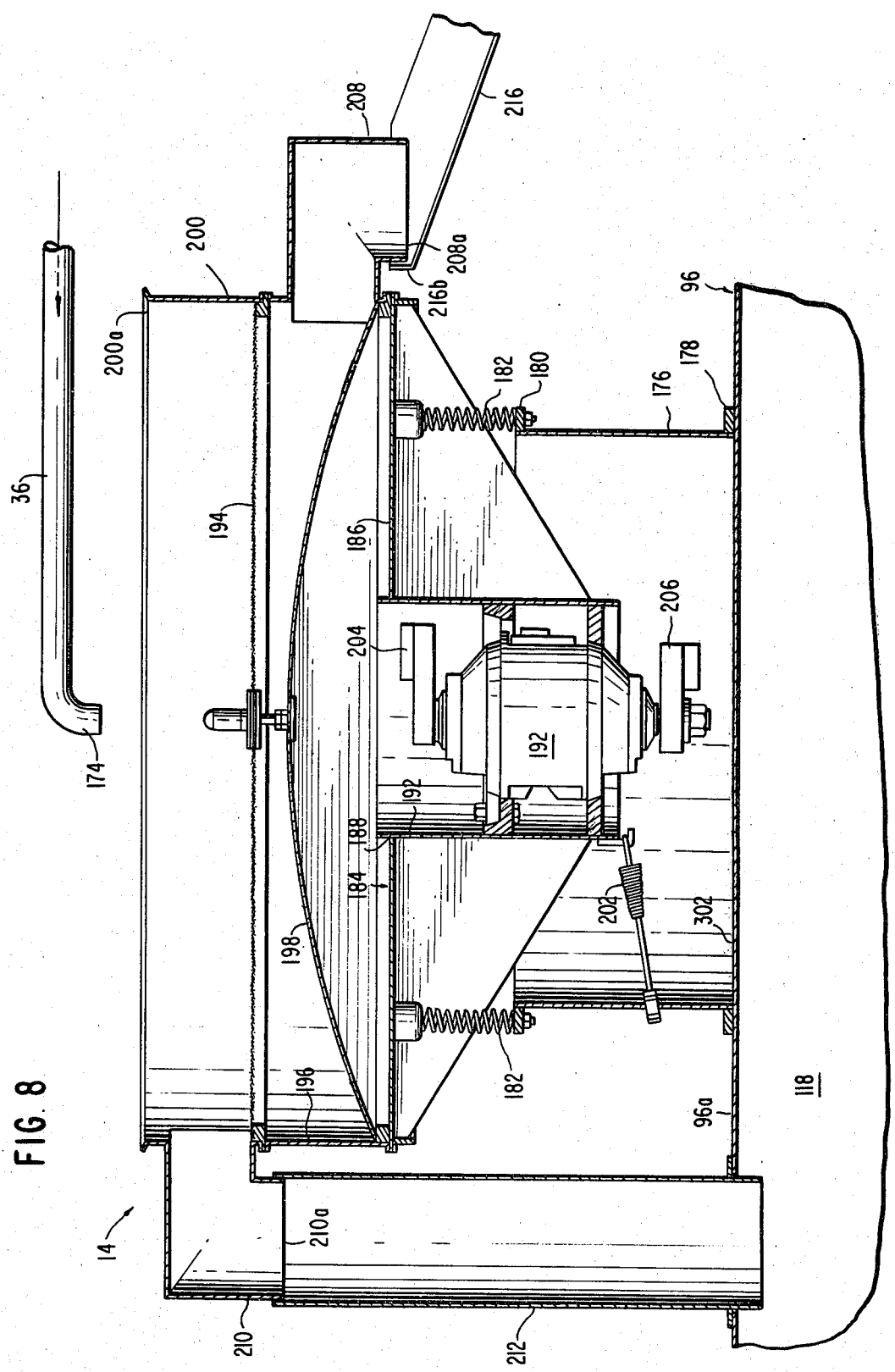
FIG. 8 is a vertical sectional view of the shaker or solids separator.
Figure 9:
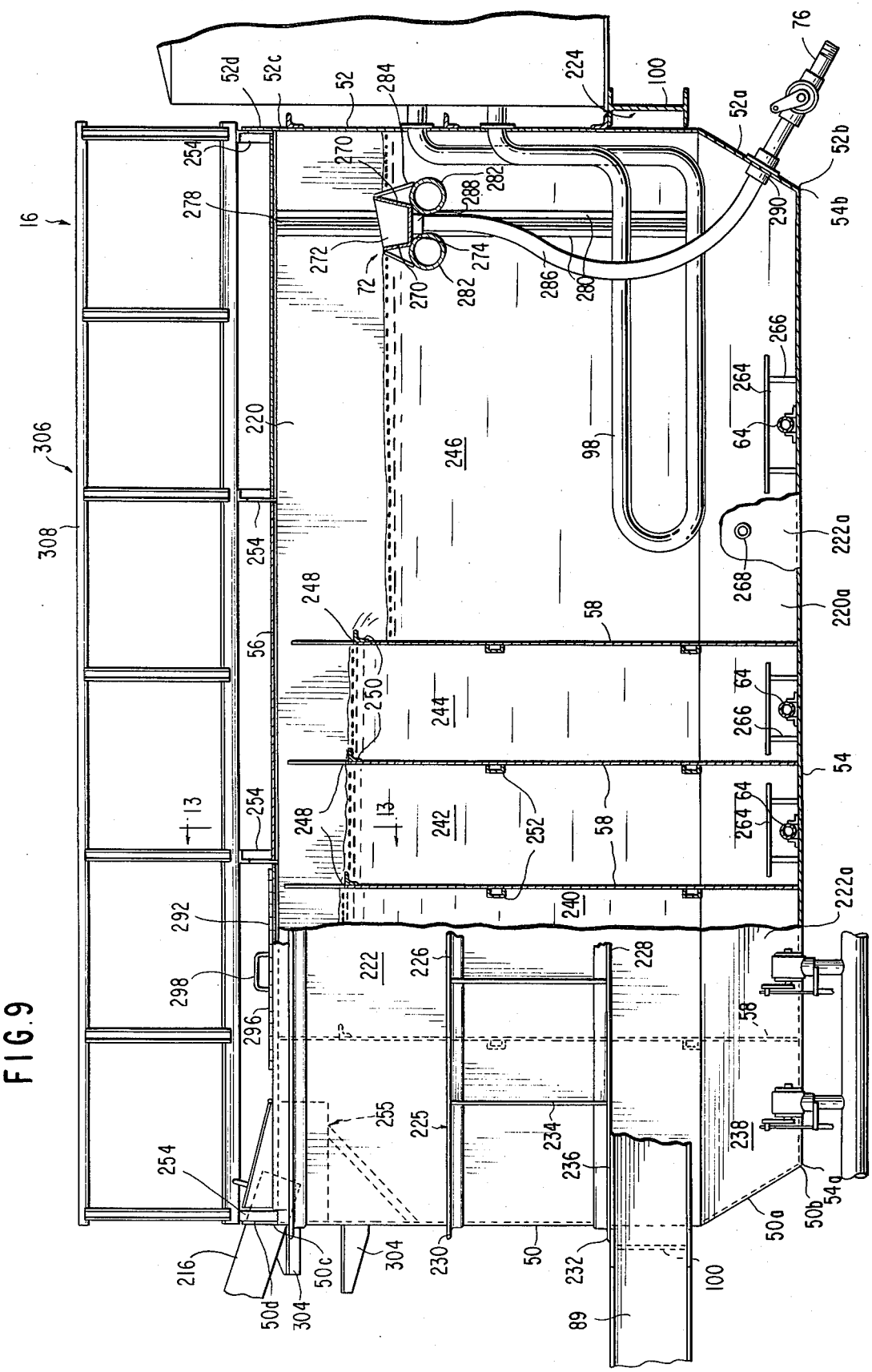
FIG. 9 is a side elevational view, partly in section of the oil/water separator tank forming another principal component of the apparatus of the present invention.

Referring first to FIG. 1, which is a schematic flow diagram for the compact waste oil cleaning apparatus of this invention, and preferably being mobile and tractor trailer mounted, it may be seen that the apparatus, generally indicated at 10, comprises basically three major components.

The first is an oil fuel burner fired heat exchanger or heater indicated generally at 12. The second is a solids separator or shaker indicated generally at 14, and the third is an oil/water separator tank or separator indicated generally at 16.

The solids separator or shaker 14 may comprise a commercial product model LS60088 SWECO separator. As may be appreciated, the waste oil requires not only separation from the water, but must be free of substantial solids.

Further, time, and therefore flow rate for the oil processed is critical and it is desired to process as much oil as possible within as little time as needed to effect maximum separation. Under the present invention, the oil indicated by arrow 20 in the schematic flow diagram of FIG. 1 is pumped by pump 18 from a waste pond or source to the oil fuel burner fired heat exchanger 12. Preferably, a chemical or chemicals capable of increasing the specific gravity of the water component or non-oil liquid component of the waste oil, is introduced to the inlet side of pump 18 as evidenced schematically by arrow 22. By suitable piping 24, the pump directs the waste oil into an annular chamber 26 defined by inner and outer, vertical axis cylindrical sidewalls 28 and 30 of the heat exchanger 12, where the flow of oil is upwardly as indicated by the arrows for discharge near the top of that vertically oriented unit. A central fire chamber 32 functions as part of the heater burner, that is, combustion of the fuel and air mixture occurs partially within the bottom of that chamber 32, preferably lined by fire brick as will be seen later, while the products of combustion flow outwardly as indicated by the arrows within that chamber and exhaust axially through a vertical tubular stack 34. The waste oil, after being heated, is directed by a solids separator, heated oil supply pipe 36 to unit 14 where the hot waste oil falls by gravity onto a vibrating perforated screen 38 through the open top 40 of unit 14. The solids are captured by the screen 38 and exit as indicated by arrow 42 through a solids discharge pipe 44 to a solids storage area or the like (not shown in this figure). The heated waste oil, free of solids, passes through the perforated street or screen 38 and exits through oil discharge pipe 46 onto an inclined chute 48 which opens up to the interior of the oil/water separator tank 16. The tank 16 is shown schematically as being of generally elongated parallelepiped form. The bottom or lower ends of the sidewalls, as well as the and walls 50 and 52 at the upstream and downstream ends of the tank 16 are tapered or inclined downwardly and inwardly as at 50a and 52a, respectively. The bottom wall 54 and the top wall 56 of the tank 16 are flat and horizontal.

The oil/water separator tank 16 is provided with a plurality of vertical separator walls as at 58, which are shown schematically as being of different height, that is, tapering in a downstream direction from the upstream chamber to the downstream chamber to define weirs to facilitate the separation process. The separator walls 58 form individual compartments within the separator tank 16. As may be appreciated, oil floats to the surface within the individual compartments while the water accumulates at the bottom of the tank compartments. The water is drained through water outlet holes or via water outlet pipes within the respective compartments as at 60. A water manifold pipe 62 extends beneath the tank and preferably to one side and is coupled to respective tanks through outlet pipes 64 bearing individual manually operated control shut off valves 66. A water discharge pump 68 is mounted to one end of the manifold pipe 62 and functions to discharge water under pressure through pump discharge pipe 70. Within the downstream compartment there is preferably provided a vertically movable skimmer 72 which is float operated, that is, it moves vertically with the level of liquid accumulating within that compartment and functions to skim off only the very top surface layer of the accumulated oil within that last downstream compartment. The skimmer 72 is an upwardly open container. Attached to the bottom is a flexible hose as at 74 whose opposite end is coupled directly to a fitting 76 sealably projecting through the inclined sidewall portion 52a of the tank 16 in this schematic representation. The fitting 76 functions as an oil outlet pipe to permit removal of oil after separation of solids and water as indicated schematically by arrow 78.

Referring to FIGS. 2–15, it may be appreciated that preferably the compact waste oil cleaning apparatus of the present invention is mobile and mounted on a tractor trailer chassis 80 so that it may be readily transported on the nation's highway system between sites requiring its use. In that respect, the specially formed tractor trailer chassis, indicated generally at 80, is provided with dual sets of wheels 82 at the rear of the trailer chassis 80, and to opposite sides thereof on dual axles, all conventional. Preferably, a large diameter steel pipe bumper 84 spans the rear of the trailer chassis 80 below a horizontal platform indicated generally at 86 and being rigidly welded by means of risers 88 to the I-beams 89 or the like forming the basic horizontal members of platform 86. Wheels 82 are suitably supported by springs (not shown). At the forward end of the chassis 80 a provision is made, as at 90, for mounting the trailer or connecting the trailer to a tractor for hauling of the trailer borne apparatus 10 to a given site. As may be appreciated, unless the ground G is flat and horizontal, it will be necessary to employ one or more jacks over the length of the chassis 80 to insure that the platform 86 is horizontal. The jacks are indicated generally at 92 and comprise telescoping members which can be vertically lowered onto the ground and then jacked to lift either the fore or aft portion of the chassis 80, and at respective sides as is necessary. Additionally, the jacks 92 function to maintain the platform stable and stationary when on site and adjacent to a pond bearing the waste oil 20.

The platform 86 bears the major basic components of the apparatus or system 10. In that respect, the heat exchanger or heater 12 is shown near the front of the trailer and to the rear of a pump indicated generally at 94 functioning to pump the waste oil into the system and through heater 12 for gravity discharge above the SWECO or other type solids separator or shaker 14. Preferably, the solids separator 14 is physically mounted in vertically upright position on a parallelepiped from solids holding tank indicated generally a 96, these two elements being at the rear of the trailer chassis 80 and extending across the width of the same. Extending a major distance along the length of the chassis 80 is the oil/water separator tank or separator indicated generally at 16.

The arrangement permits purposely a U-shaped pipe 98 having open ends which project into the central fire chamber of the heater 12 to pick up and return the products of combustion. In passing through the pipe loop 98, they act to heat the oil within separator 16. The loop penetrates end wall 52 of the separator tank and extends into at least the most downstream compartment of tank 16 where oil is removed from the tank by a skimmer 72.

As may be appreciated, the chassis 80 is formed by a number of longitudinally spaced transverse I-beam members as at 100 welded at their ends to the sides of the major I-beams 89 running the length of the unit. By tapering the sidewalls of the separator 16 inwardly at the bottom, tank 16 may be fitted to an opening defined by I-beams 89 and 100 at that location. Additionally, for the heater 12, the longitudinal spacing of the transverse beams 100 is purposely effected to support opposed ends of heater 12 whose diameter is also sized to the lateral distance between the I-beams 89 extending the length of the trailer. As necessary, steel plates may be welded to the top of the chassis or frame I-beams to provide an imperforate deck. The solids holding tank 96 may be segmented to form separate compartments, one for holding solids and the other for holding diesel oil feeding a burner forming a portion of heater 12, as well as for operating one or more diesel engines. The engines may drive oil pump 94 for pumping the oil through the system and/or an electrical generator unit functioning to generate electrical power necessary for operation of the system components including an electric motor driven blower associated with the heater 12.

Preferably, a streamlined sheet metal casing 102 is integrated with the chassis 80 at the forward end of the chassis and encompasses a defined area housing pump 94 as well as a cylindrical diesel fuel burner unit indicated generally at 104 and fixed to and projecting horizontally outwardly of the heater 12, at the bottom thereof. Also positioned within housing 102 is a blower unit indicated generally at 106 and comprised of a standard squirrel cage blower. A scroll housing 108 holds a squirrel cage rotor 122 which is electrically driven by means of motor 110 by way of motor shaft 112 to which it is directly attached. Blower unit 106 may comprise an Eclipse turboblower under trade designation 5M6623 manufactured by the Eclipse Corporation of Rockford, Ill. A diesel engine generator set 113 is preferably mounted additionally within housing 102 at the front end of the compact apparatus, receiving diesel fuel from diesel fuel storage compartment 114 forming a portion of the solids holding tank 96 via a pump (not shown). The solids holding tank 96 includes a vertical transverse partition 116 defining in addition to compartment 114 storing diesel fuel for the burner and engines, a second chamber or compartment 118 which acts as a solids holding compartment.

By reference to FIGS. 4–7, the structural details of the heater 12 and its associated apparatus may be fully appreciated, particularly in terms of the novel arrangement for heating the oil in direct heat exchange by confining the oil within a vertical annular chamber concentrically surrounding and separated from the center fire chamber in which combustion is fully accomplished and through which the products of combustion escape. Further both the flow of the oil and the products of combustion are over extended helical paths on opposite sides of a vertical axis cylindrical metal sidewall separating the central chamber from the annular chamber housing the oil. The blower housing 108 extends vertically upward from the platform 86 and includes an opening within a front vertical face thereof as at 120, permitting air to enter directly into the area occupied by the squirrel cage rotor 122. The housing 108 is of scroll form terminating in a tubular blower outlet portion 108a which connects by way of a tubular pipe 124 directly to a flanged inlet end 126a of a cylindrical fire box 126 of burner 104. Burner 104 is oriented horizontally and opens up to the interior of the heater 12 through a direct coupling by way of a second flange 126b of fire box 126 to the flanged end 128a of a tubular burner inlet pipe 128 passing through outer sidewall 30 of the heater 12. The blower electrical drive motor 110 is physically mounted on a stand as at 130 to the rear of the scroll housing 108. It should be noted that the fire box is not mounted in axial alignment with the vertical axis of heater 12 but is rather laterally offset. Further, burner inlet pipe or duct 128 projects completely through the outer cylindrical wall 30 of the heater and opens up to the interior of the central fire chamber 32 by terminating at the inner cylindrical wall 28 of that unit. As may be appreciated, both the fire box and inlet duct 128 may be lined with fire brick 132 or like refractory material mounted between and supported by radially projecting rods or supports 134, upon which the refractory material is fixed.

As may be seen in the vertical sectional view, FIGS. 4 and 6, for heater 12, a circular bottom wall 136 of cast iron or sheet steel and sized to the outer cylindrical sidewall 30 is welded to the lower end of that sidewall to close off the bottom of the heater 12. The inner cylindrical sidewall 28, of substantially smaller diameter, acts in conjunction with a false bottom wall 138 to form a cylindrical oil inlet chamber 140 beneath the inner fire chamber 32 of heater 12. A spiral metal strip 142 mounted within chamber 140 causes the oil which enters into the chamber 140 near its center by way of oil inlet pipe 144 to circulate initially in an extended length spiral heat exchange path beneath fire chamber 32. Chamber 140 is open at its periphery directly to the lower end of annular chamber 26 defined by the spaced cylindrical sidewalls 28, 30. Mounted within the annular chamber 26 is a further metal strip 146 of L-shaped vertical cross-section which is helically wound and welded or otherwise attached at its sides to walls 28 and 30 so as to define a closed helical path 148 for the oil which is caused to rise vertically within the annular space 26, that is, confined between the cylindrical sidewalls 28 and 30.

A conical metal top wall or cap 150 closes off the top of fire chamber 32 with the lower peripheral edge 150a of that member being welded to the upper end of inner cylindrical sidewall 28. A tubular metal stack 152 is welded to the edge of a hole 154 formed within conical top wall 150 and extends vertically upward and projects through a circular hole 156 within a corresponding outer conical metal top wall or cap 158 sized to and welded at its outer periphery 158a to the upper end of the outer cylindrical sidewall 30. Thus, the annular cavity 26 is joined by a conical cavity 160 which functions as a collector for the oil after the last helical pass between vertically spaced portions of the L-shaped strip 146 within chamber 26. Since the oil is forced through the heater 12 under pressure, due to operation of the diesel engine powered pump 94 via oil delivery pipe 144 after heating, the oil must pass out of conical chamber 160 which it does by way of oil outlet fitting 162 within conical top wall 158 of that unit. Oil is provided to the system by way of an oil inlet pipe 164 which projects through housing 102 and is connected to the suction side of pump 94.

As mentioned previously, it is desirable for the hot air or hot products of combustion resulting from an air fuel mixture ignition within burner 104 to effect excellent heat exchange with the oil confined within annular chamber 26 defining the principal area of heat exchange between these two fluids. In that respect, not only is the interior of the cylindrical fire box 126 lined with refractory material by way of rods or anchors 134, but in addition, at least to the height of the burner inlet opening, refractory material is provided to the inside of the fire chamber 32 and maintained by way of rods or anchors 134 projecting from the false bottom wall 138 and the inner cylindrical sidewall 128 of that assembly. Additionally, a helical metal strip of inverted L-shaped configuration, as at 165, is welded to the inside surface of the inner cylindrical sidewall 28 and helically wound to form a helical hot air fin array extending the vertical height of the inner cylindrical sidewall 28. The tangential flow of hot products combustion from the tubular fire box 126 changes initially to a spiral form and then to helical flow, hugging the periphery of the vertical cylindrical metal wall 28. As such, there is a ready conduction transfer of heat from the products of combustion within chamber 32 to the trapped oil within the annular chamber 26. As may be appreciated, the heat rises within fire chamber 32 and seeks, partially due to the inclined surface of conical top wall 150, the stack 152 functioning as a flue for the heater 12. Preferably, the oil flow and the hot air or products of combustion on opposite sides of the cylindrical wall 28, are along a confined helical path for the oil and an open helical path for the products of combustion which flow in opposite directions for maximizing heat transfer between the highly viscous oil and the very hot products of combustion from burner fire box 126.

Purposely, the ignition means are not shown. Diesel fuel is fed from the diesel fuel storage compartment 144 to burner 104 through diesel fuel supply line 166. High temperature combustion occurs within this horizontal axis tubular burner 104 with combustion completed within the bottom of fire chamber 32 and within the area of the refractory material lining the inner surface of false bottom wall 138 and the inner cylindrical sidewall 28 at its bottom. Refractory material is carried to a height necessary to protect the confined oil within annular chamber 26 as well as within the cylindrical chamber 140 between the false bottom wall and the bottom wall of the heater leading radially to the annular chamber 26 where the majority of the heat transfer is effected.

The heater 12 is also provided with a vertical axis cylindrical manhole tube 167 which projects through the top wall 158 to the side of stack 152 for access to the fire chamber 32 within the inner cylindrical sidewall of the heater 12. The top of the tubular member 167 is closed off by an appropriate cover 168 which is locked to the manhole tube by way of flange 167a, to which is bolted the outer periphery of cover 168. Since the purpose of the heater is to maximize heat transfer between products of combustion of burner 104 and the oil captured within cylindrical chamber 140, annular chamber 26 and conical chamber 160, the oil is removed as close to stack 152 as possible. In this respect, oil outlet pipe 169 projects through an opening 170 formed within conical wall 158, the pipe being horizontal at the point where it projects into chamber 160 and being appropriately sealed thereto at the connection point. The heater oil outlet pipe 169 connects via elbows 172 to a heated oil transport or supply pipe 36 extending across the top of separator 16 and which terminates at its end remote from the heater 12 in a downwardly directed, vertical axis discharge nozzle 174 centered above shaker 14 at the rear of chassis 80.

The shaker or solids separator 14 comprises, in the illustrated embodiment, a model LS60088 SWECO separator. Basically, this commercial product comprises a cylindrical base assembly 176 bolted or otherwise mounted by way of a bottom flange 178 to the top of the solids holding tank 96. The base 176 is flanged at its upper end as at 180 and mounts through a series of coil springs 182, a lower table assembly, indicated at 184. The lower table assembly 184 comprises essentially an annular sheet metal plate 186 having an opening 188 at its center which bears a vertical axis cylindrical casing 190 within which is housed an electric drive motor 192 to effect the vibrating action to the unit and through the lower table assembly to a circular screen 194 which extends horizontally above the annular plate 184 and is fixedly mounted thereto by way of a vertical axis sleeve 196. A spherical sheet or table dome 198 overlies the annular plate 184 and directly underlies the screen 194. The screen 194 bears perforations of a predetermined mesh size so as to permit the heated oil to pass through the screen under vibration, while the solids are prevented from passing therethrough and accumulate on the upper surface of screen 194.

A further sleeve 200 extends vertically upward from screen 194 and is open at the top as at 200a to receive the heated oil discharging from nozzle 174. In addition to a number of coil springs 180 interposed between and mounting the lower table assembly on the fixed base assembly 176, the bottom of the cylindrical casing 190 is linked to the base assembly by way of a plurality of oblique balance spring assemblies indicated generally at 202. As may be appreciated, eccentric weights are provided to opposite ends of motor shaft as at 204 and 206, respectively, and it is these eccentric weights which set up the vibration to permit the shaker 14 to separate the solids from the heated waste oil within the interior of the upper sleeve 200 and above the screen 194. The heated waste oil, free of solids, flows over the table dome 198, and to one side there is provided a table frame discharge spout as at 208 having an open end 208a which opens downwardly and beyond the periphery of sleeve 196 from which this member projects.

Angularly displaced from spout 208, is a second solids discharge spout 210 which projects outwardly from sleeve 200 and has an end 210a which opens downwardly. As may be appreciated, the table frame discharge spout 208 may be oriented angularly to suit the installation conditions but should be arranged to maintain balance of the unit, as may be similarly, solids discharge spout 210.

A relatively large diameter metal pipe 212 extends downwardly from the discharge spout 210 functioning as an extension of the vertical axis portion of that spout, is sealably connected at its upper end to the spout, and projects into or opens through the top wall 96a of the solids holding tank 96, at compartment 118. A removable cover 214 is provided on a vertical sidewall 96b of the solids holding tank to permit removal of accumulated solids within that tank. The shaker 14 is mounted at a vertical height such that the top wall 56 of the oil/water separating tank or separator 16 is at or slightly below the level of the table frame discharge spout 208. In the illustrated embodiment, an inclined metal chute 216 extends upwardly from vertical end wall 50 of the separator 16, near the top of the separator, with its upper end 216b underlying the discharge opening 208a of discharge spout 208 such that the heated waste oil, with the solids removed flows by gravity through an opening 218 within the tank vertical wall 50 into the interior tank 16. As may be appreciated by viewing FIGS. 9-14 the separator 16 which is formed of welded sheet steel plates is of generally parallelepiped or rectangular box form. In addition to longitudinally spaced vertical end walls 50 and 52, at the upstream and downstream ends, relative to the incoming waste oil from shaker 14, and the horizontal bottom and top walls 54, 56, respectively, the unit includes laterally spaced vertical sidewalls 220 and 222, respectively. The chassis 80 has its transverse beams 100 at the center separated a significant distance longitudinally to define a relatively large rectangular opening 224 which receives the separator tank 16 such that a portion of the tank 16 is disposed below the level of the chassis I-beams. In that respect, a rectangular mounting frame assembly indicated generally at 225 is formed of angle bar members which are welded together. These include upper and lower side members 226 and 228 and upper and lower end members 230 and 232. Vertical risers 234 of a width corresponding to the width of the horizontal legs of the angle bar members extend between these legs at spaced positions and are welded at respective ends thereto to form a rigid open framework. Further, holes may be provided as at 236 within the horizontal legs of the lower angle bars 228 and 232 so that the unit can be bolted onto the chassis permitting removal of the tank 16 if repair or replacement is required.

As may be appreciated, the tank 16 is specifically configured to control the disposition of the water and oil during the gravity separation process as well as to facilitate removal of the water from the bottom of tank 16 at all compartments, and accumulated oil at a higher level within the most downstream compartment from the entry of heated oil, after solids removal, at the upstream end 50 of the tank 16.

In that respect, as mentioned previously, internally of the tank 16 there are provided a plurality of vertical transverse compartment separator walls indicated at 58 which define in the illustrated embodiment five compartments in order from the upstream end wall 50 to downstream end wall 52, as at 238, 240, 242, 244 and 246, respectively.

Vertical end walls 50 and 52, at their bottoms, are cut obliquely at both sides, forming opposed, inclined edges, as at 50a for end wall 50 and 52a for end wall 52. Horizontal edge 50b at the bottom of end wall 50 is of a width equal to the width of bottom wall 54 of the tank 16.

Both end walls 50 and 52 also include trapezoidal extension plates 50d and 52d welded along the upper edges 50c, 52c of walls 50, 52. As shown in FIG. 11 plate 50d is cut out as at 50e to provide an opening through which the lower end 216a of chute 216 can be inserted.

The vertical compartment separating walls 58, internally of tank 16, are generally configured to end walls 50 and 52 and rise the full vertical height of the tank. However, in order to effect flow of waste oil from compartment to compartment in a downstream direction after filling of the upstream tank, trapezoidal or rectangular weir openings 248 are provided within the compartment separating walls 58 and across the compartments at this level extend reinforcement angle bars as at 250 directly underlying the horizontal bottom edges 248a of the openings to reinforce the weirs. Further, the weir openings 248 are of increasing vertical depth for the compartments in a downstream direction, for instance being twelve inches, thirteen inches, fourteen inches and fifteen inches for walls 58 defining in a downstream order compartments 240, 242, 244, and 246. As may be appreciated, additional bars or reinforcing members may be employed at different levels extending transversely across the tank to reinforce the tank. Such members may be of angle iron form or of U-shaped configuration, as for instance those at 252, the approximate vertical mid-point of the tank 16. Angle irons or angle bars may be employed as at 254 across the top wall 56 at longitudinally spaced positions to support the catwalk 306.

Since the bottom wall 54 is much narrower than the top wall 56, there is a requirement that both end walls 50 and 52 and both sidewalls 220 and 222 terminate with their bottom portions inclined inwardly towards the rectangular bottom wall 54. In that respect, upstream end wall 50 includes a bottom wall portion 50a which is inclined inwardly to meet leading edge 54a of the bottom wall 54.

The bottom wall 54 is of shorter length than the longitudinal extent of top wall 56. Thus, the opposite end wall 52 is provided with an inwardly inclined portion 52a at the bottom such that the bottom edge 52b of the end wall 52 meets the edge 54b of the bottom wall 54, at the downstream end of the tank. Further, the laterally opposite vertical sidewalls 220 and 222 of the tank have inwardly inclined portions as at 220a and 222b at their bottoms which are inclined at a relatively steep angle corresponding to inclined edges 50a of end wall 50 and corresponding inclined edges 52c for end wall 52. The bottom edges 220b and 222b of respective sidewalls 220 and 222 abut opposed side edges 54c of that member and are welded thereto. In that respect, all of the tank wall sections are formed of sheet steel or the like and the edges are welded together to complete the enclosure and to render it liquid tight.

The lower end 216a of the chute 216 projects into tank compartment 238, via opening 217 and this end of the chute overlies a perforated basket indicated generally at 255, the basket is rectangular in configuration, is slightly wider than it is long, and its dimension transverse to the longitudinal axis of the tank is larger than its dimension lengthwise of the same tank. It is formed with opposed lateral sidewalls 256 which have tapered or inclined upper edges 256a from a vertical rear wall 258 in a direction towards tank sidewall 50 to which the ends 256b are welded. A bottom wall 260 completes the basket and that wall 260 is perforated so that basket 255 functions as a filter for the incoming heated waste oil, free of solids. The basket 255 is supported by inclined struts or supports 262 which are welded at one end to the end wall 50 with their opposite ends being welded to the bottom wall 260 of the basket 255.

As may be appreciated, the oil bearing water or other liquid of heavier density than the oil, enters the initial or upstream chamber 238 and fills that chamber to the extent of weir opening 248 within the first upstream compartment separator wall 58. During the process of flowing from compartment to compartment, the water being of heavier specific gravity tends to settle within the bottom of the compartments while the lighter oil floats to the surface and when reaching the level of the first weir opening 248, oil free of some of the water flows into the second compartment 240 where the process continues. Purposely, the last downstream compartment 246 is of much larger volume than the upstream compartments. It is in this compartment that the oil with solids and water removed is recovered. Such oil may be sent to a refinery for further processing if the oil is in raw petroleum form.

As mentioned previously, it is desired to remove the water periodically as it accumulates within the bottom of the compartments 238 through 246 without disturbing the oil floating on the surface of the heavier liquid component. This is partially facilitated by the tapering given to the bottoms of the compartments by the inclined sidewall and endwall portions. Further, it is desired to remove the water at the center of each compartment, at the very bottom. In that respect, openings 60 are provided within the inclined sidewall portion 220a for the illustrated tank just above bottom wall 54 through which project water outlet pipes 64, one for each compartment. Pipes 64 lead to a common water manifold pipe 62. Within pipes 64 are carried manual control valves 66, one for each water outlet pipe 64. Further, a flat, rectangular vortex prevention plate 264 is horizontally mounted overlying the open end 64a of the water outlet pipe and spaced several inches above that pipe by way of vertical posts 266 mounted near the four corners of plate 64 and vertically welded at respective ends to the plate 264 and to the bottom wall 54 of tank 16. Thus, the water cannot directly seek opening 64a in each water outlet pipe but must flow about the edges of the vortex prevention plate to reach the outlet pipe opening for removal from the bottom of the tank at each location. Alternatively holes may be formed in the bottom wall 54 at each compartment to drain the water. A tube or pipe 268 projects through a longitudinal sidewall such as 222, and specifically within the inclined portion 222a of that member which may function as a sight glass for viewing the interior or the tank at that level for the compartment housing the skimmer. As indicated previously, to insure that the oil which is primarily found within the downstream compartment 246 is maintained at a relatively low viscosity, the reheat loop pipe 98 extends within that compartment in a manner such that it does not interfere with the mechanism for physically removing the accumulated oil from compartment 246.

In that respect, the illustrated embodiment utilizes skimmer 72. Skimmer 72 comprises an upwardly open box of generally rectangular configuration including laterally opposed sidewalls 270, longitudinally opposed end walls 272 and a bottom wall 274, all of imperforate sheet metal material. The skimmer box may be of welded construction along its edges such that it is liquid tight. The end walls 272 may bear vertical ribs 276 on the outside faces of the same which fit within vertical slots or grooves 278 defined by opposed angle bars or strips 280 which are welded or otherwise attached to both vertical sidewalls 220 and 222 above the tapered or inclined sidewall portions 220a and 222a, respectively. Thus, the slots 278 define tracks for the skimmer box to ride permitting it to move freely vertically.

To effect the desired position so that the very purest oil will flow into the skimmer box, in the illustrated embodiment paired floats which may be spherical in form or elongated tubes are employed as at 282 fixed to sidewalls 270 of that member by way of mounting bars or rods 284. The floats are properly sized so as to permit partial immersion of the skimmer box within the oil to the extent where oil flows into the interior of the box. An opening is formed within bottom wall 274 of the box and one end of a flexible hose 286 is mounted to the bottom wall by fitting 288 about the opening and is open to the interior of the box. The opposite end of the hose is coupled to a fitting 290 which projects through end wall inclined portion 52a of the tank. Fitting 290 is connected to an oil discharge pipe 76 for removing water and solids free oil at highly reduced viscosity. The skimmer 72 with its flexible hose 74 is only one arrangement for achieving continuous removal of oil with the skimmer rising and falling with the level of accumulated oil within the larger size downstream compartment 246.

Further, by using a skimmer which floats on the accumulated oil within that compartment 246, oil removal may continue even while water is being removed from that compartment by water discharge pipe 64.

Access is required to the interior of the compartments 238 through 246 for periodic cleaning and for maintenance. In that respect, at given locations, top wall 56 of tank 16 is provided with a hinged rectangular covers as at 292 which cover correspondingly sized rectangular openings 294 within that top wall. Hinges 296 function to hinge one edge of each cover while a U-shaped handle 298 or the like may be applied to the upper face of each cover to facilitate pivoting of the cover to open position. In order to reach covers 292 and in facilitate working on the apparatus components, the compact trailer carried apparatus bears a ladder and catwalk system running the major length of the trailer from the rear towards heater 12. In that respect, a ladder 300 is mounted vertically to the rear end of chassis 80, extending upwardly from near ground level to the horizontal top wall 302 of solids holding tank which functions as an operator platform for reaching components within the system. As may be appreciated from FIG. 3, which illustrates in top plan fashion the components of the trailer mounted waste oil cleaning apparatus 10, the ladder 300 is on one lateral side of the chassis 80 such that the portion of the solids holding tank top wall 302 forms a first level walkway about and around the shaker 14. Further, since the upstream sidewall 50 of the separator tank 16 rises vertically well above the level of the solids holding tank top wall 302, steps are required to reach the top wall 56 of the separator. One or more steps 304 may be welded to the exterior of the end wall 50 of the separator to permit the operator to climb onto the top of the oil/water separator tank 16. Extending the length of tank 16 is a raised catwalk or narrow platform indicated generally at 306 along at least one edge of which extends a railing 308 formed of welded metal rods as a safety feature. Likewise, further railings may be provided as at 310 along the open sides and end of solids holding tank top wall 302 rising vertically from the top wall 302 of that unit.

As may be appreciated from FIG. 10, the rectangular openings or holes 294 to the side of catwalk 36 within top wall 56 of the separator 16 permits ready viewing and access to the interior of the compartments, the openings 294 may extend over two compartments or portions of such compartments such that the covers 292 partially overlie multiple compartments and the compartment separating walls 58. Weir openings 248 are in turn open to viewing from the exterior of the tank 16 for direct viewing of the flow of waste oil from compartment to compartment towards the final separating compartment 246 where the water free and solids free oil is removed through skimmer 72.

In addition to directing heated oil from inlet pipe 144 through heater 12 for significantly reducing the viscosity of the waste oil, and then subjecting the oil directly to a solids/water separating treatment via shaker 14 and separator 16, under certain circumstances it is desirable simply to heat a portion of the waste oil from the pond and return it to the pond to bring the pond retained oil up to a viscosity permitting separation and smooth removal from the pond and passage through the waste oil cleaning apparatus 10. For this reason, the apparatus is provided with two additional pipes other than the heated oil supply pipe leading from burner 12 to the shaker 14. As seen in FIGS. 2 and 3, the heated waste oil supply pipe feeding heated waste oil from the heater 12 to the shaker 14 includes a manually operated shutoff valve 312 which, when open, permits discharge of heated waste oil onto the open top of shaker 14. When closed, however, the oil must be diverted. A somewhat smaller sized oil return pipe at 314 is connected at one end 314a directly to supply pipe 36, upstream of valve 312, while its opposite end opens into the outer cylindrical sidewall 30 of the heater 12 and to the annular heat exchange chamber 26 between inner vertical cylindrical sidewall 28 and the outer sidewall 30. Thus, oil may be simply recirculated with by pipe 314 functioning as a return loop pipe for the system. It should be further noted that the return pipe 314 includes a manually operated shutoff valve 316 just downstream from the point where end 314a of that pipe is connected to the heated oil supply pipe 36. However, just upstream of the manually operated control valve 316, there is connected an end of a further pipe 318 which opens thereto at its upper end, while its lower end is joined by way of a Tee connection to a horizontal pipe 320 which extends laterally across the top of chassis 80 and whose ends project just beyond the sides of the trailer chassis. The pipe 320 may carry valves such as at 322, at its opposite ends, for controlling flow outwardly from the ends of that pipe. The purpose of pipes 320 and 322, and the pipe 318 supplying oil thereto is to permit waste oil to be heated by heater 12 and returned to the oil pond. This permits under partial operation of the waste cleaning apparatus, the viscosity of the pond waste oil to be materially reduced by circulating oil to and from the pond, through burner 12, for heating without any separation of the solids or water content. In addition to valve 322, there is provided a manually operable shutoff valve similar to valve 322, at 324, within the end of pipe 318, just downstream from the point where the pipe connects to pipe 314.

As may be appreciated, valves 312, 316, 322 and 324 may be electrically controlled valves rather than manually operated shutoff valves. In that respect, preferably a single control panel 326 is provided for the system or apparatus components, the control panel 326 preferably being mounted to tank 16 end wall 50, to the side of steps 304, FIG. 3. Electrically operated water pump 68a being mounted to the water manifold pipe 62, at one end thereof, carries a pump discharge pipe 70 projecting outwardly of the pump. Pipe 70 permits coupling to a hose or the like leading to a storage area, stream or safe discharge for the water removed from the oil and previously contaminating that waste oil. The water, since it is highly contaminated, may necesarily require transport to a tank car or tank truck remote disposal site. In order to effect controlled removal of water from the various compartments, as mentioned previously, manually operated shutoff valves as at 66 are provided within each of the branch lines or water outlet pipes 64 leading from the oil/water separator tank 16 at each compartment location and connected to the common water manifold pipe 62.

In a simplified arrangement, each valve 66 includes a pivotable valve actuator 66a which is movable approximately 90° to effect full shut off from valve full open position, and vice versa, upon reversal. Preferably, as shown schematically in FIG. 15, a table or stand 332 is mounted to the top wall 302 of the solids storage tank and is positioned to the side of shaker 14, adjacent rail 310. The table or stand 332 includes a horizontal table top 334 upon which are mounted in side-by-side fashion a plurality of L-shaped levers 336 which are individually pivotable on a common pivot pin 338 which projects horizontally through those members and fixed at its ends to table top 334. One arm of each L-shaped actuator lever is connected to one end of an operating cable 340 which is trained by way of suitable pulleys 342 and extends to a valve actuating arm 66a of a corresponding shutoff valve 66 for the various water outlet pipes for compartments 238 through 246 inclusive. There are five outlet pipes and five valve actuating levers on stand 332 selectively connected by way of individual cables to the five valves within outlet pipes 238. An end of a cable is suitably connected to the end of the actuator arm 66a for each valve, such that when the valve actuator levers are pivoted approximately 90°, a corresponding movement of the valve actuators 66a occurs at the valve locations shifting the valves from open to closed position, and vice versa upon reverse pivoting. Pump 68 is then operated by energizing the pump drive motor to pump the water from the bottoms of the compartments whose valves 66 are open, forcing the water under pressure through a hose or the like for transport to an adjacent disposal sit or into a suitable tank car or truck.

As may be appreciated, instead of manually operating valves 66, the valves 66 could be electromechanically operated in which case control could be effected via control panel 326.

Further, as mentioned, since the apparatus is self-contained and fully operational irrespective of electrical energy available on site, the diesel engine generator unit (not shown) which is preferably located at the front end of the tractor trailer, is provided with diesel oil stored within a compartment of solids storage tank 96. Again, the electrical control panel 326 may house the electrical controls for operating and monitoring the generator element of the diesel engine generator unit. The same is true for an electric motor if used for pump 94 functioning to pump oil from the pond to heater 12 as well as the electrical motor 10 for blower 106. Electrical power is also required for the ignition system accompanying burner 104. Purposely, the electrical circuitry for these elements of the apparatus are not shown since the components themselves are commercially available as well as their control system.

In order to determine, however, when the water should be removed after accumulation to a significant degree within the individual compartments 238 through 246, each compartment is provided with a water accumulation indicator shown generally at 346, FIG. 14. As may be appreciated, the compartment separating walls 58 at each location bears a vertical tube 348 which extends vertically upwardly adjacent to the wall being mounted thereto by way of supports 350 at two or more locations along the length of the tube 348. A rod 354 is freely slidably mounted within the tube 348 and at its lower end is provided with a spherical float 352 which causes the rod to slide up and down within tube 348. The rod is of a given vertical height and bears a flag 356 at its upper end such that as the float moves upwardly, as indicated by arrow 358, the flag 356 is moved also vertically upwardly so as to project above the top wall 56 of the oil/water separator tank 16, thereby indicating the accumulation of significant water W beneath the level of the oil O within a given compartment. As may be appreciated, some of the water W is separated in the upstream or initial tank 238, while additional water accumulates within all of the downstream tanks including the furthermost downstream compartment 246. Water accumulating within the upstream tanks such as 238, 240 may have to be removed more frequently than that accumulating within the downstream compartments, during the separation process.

Additionally, while the indicating system 346 is purely visual, that is, it requires the operator to note the position of flag 356 and to effect the removal of water as a result thereof, electrically or electronically, sensors may be provided such that upon the accumulation of water W to a given level within one or more of the compartments 238 to 246, automatically a valve or valves 66 are opened and the motor driving the water pump 68 is energized to automatically bring down the water level within given tank compartments to an acceptable initial level. Also, since the function is to remove only water from the individual compartments, the operator must be careful to remove only a given amount of water from the compartment to the extent of lowering flag 356 where it is no longer visible. Otherwise, it is possible that some of the oil O may be removed from a given compartment, via the water outlet pipes.

While the specific gravity differences between water and oil permit ready separation and rise of the oil to the surface of the water, to facilitate the separation process, the separation process is enhanced by increasing the specific gravity of the water by the addition of a chemical or chemicals.

In that respect, a storage tank for such chemicals is indicated at 360, FIG. 2, mounted to chassis 80 and below and behind hitch location 90 at the front of the tractor trailer. A chemical feed line or pipe 362 leads from the tank to the oil inlet pipe 164 at the suction side of pump 94. Thus, chemicals may be readily mixed with the waste oil prior to its introduction to heater 12.

Schematically, a valve 364 is located within chemical feed line 362 upstream of the connection point between that line and waste oil inlet pipe 164 to meter the flow rate of chemicals which are mixed with the oil prior to introduction into heater 12 through pump discharge line 144. A chemical indicated schematically at 22, FIG. 1, is thus introduced to the waste oil 20 to favorably influence the specific gravity differential between the oil and the liquid contaminate.

In operation, chemicals are fed from chemical storage tank 360 to oil inlet page 164 and pumped by pump 94 into the heat exchange chambers of heater 12 where the heat from the products of combustion by operation of burner 104 materially reduces the viscosity of the oil facilitating separating and flow through the apparatus. Diesel fuel stored in diesel fuel storage tank 114 is fed to the burner 104, ignited within the fire box with the flame and products of combustion discharging tangentially into the bottom of the fire chamber, where the products of combustion take an initial spiral and then a helical path along the inside surface of the inner vertical cylindrical sidewall, whereupon the products of combustion exit from stack 152, axially of heater 12. The oil flows in an initial spiral flow path within a chamber defined by the bottom and false bottom walls of the heater 12 and subsequently follows an upward helical flow path within annular chamber 26 defined by the inner and outer cylindrical sidewalls 28 and 30 of heater 12. The now hot waste oil is supplied through supply pipe 36, under pressure due to pump 94 operation, to the shaker 14 where the solids are removed and the waste oil carrying the contaminant water, free of solids, flows to the oil/water separator tank 16. The tank 16 bears a plurality of compartments with the oil seeking the downstream compartment by moving through weir openings of increasing vertical size, in a downstream direction. The water contaminant is periodically removed from the bottom of the tank compartments through valve and outlet pipes leading from the bottom of those compartments to a common water manifold pipe. A float operated skimmer in the most downstream compartment functions to skim off only the upper layer of accumulated oil within that compartment which is now free of water and solids and which may be commercially treated at a refinery or the like. The apparatus is highly compact, is mounted on a tractor trailer for transport to on site location, has components which are diesel engine driven (possibly by means of the waste oil once solids and water contaminant free) or operated electrically by way of a diesel engine electrical generator set mounted to the tractor trailer chassis itself.

The unit is, therefore, self-contained and self-powered and requires no on site energy except diesel oil stored within a diesel oil storage tank integrated to the apparatus itself. Highly effective heat exchange occurs between the oil and the products of combustion of the diesel oil fired burner with low viscosity oil subsequently separated from its solid content and its water content prior to discharge as clean oil from the water-/oil separator tank.

Alternatively, waste oil may be preliminarily heated and circulated to and from the waste oil pond to initially reduce the viscosity of the waste oil within the pond to facilitate subsequent separating operation where the oil whose viscosity is decreased is then pumped completely through the apparatus. Likewise, the apparatus facilitates temperature increase to the oil within the oil/water separator by a loop pipe projecting through at least the most downstream compartment of the separator by feeding the heater products of combustion through that compartment within confined tubing loop.

While the invention has been particularly shown and described with reference to a preferred embodiment thereof, it will be understood by those skilled in the art that various changes in form and details may be made therein without departing from the spirit and scope of the invention.

What is claimed is:

1. A compact, mobile waste oil cleaning apparatus comprising:
   a tractor trailer chassis including an elongated horizontal platform,
   an oil burner fired heater of cylindrical form fixed to said platform and having its axis vertical thereto,
   said heater comprising concentric inner and outer vertical metal sidewalls defining a central vertical fire chamber internally of the inner wall and an annular oil flow chamber between said walls,
   helical strip means between said metal sidewalls and along the inside of said inner sidewall, respectively, defining helical heat exchange paths within said chambers along opposite surfaces of said inner sidewall from the bottom to the top thereof, a burner including a fire box opening up tangentially to said inner chamber at the bottom thereof for facilitating helical flow of the burner products of combustion along the inner surface of said inner sidewall, means for supplying a fuel and air mixture to said burner fire box for combustion therein such that the products of combustion flow along said inner helical path within said central chamber for exhaust through the top of said central chamber.

means for pumping waste oil through said other helical path within said annular chamber, a vibrating screen type solids separator mounted on said platform to one side of said heater at a vertically raised position, means for feeding oil heated by said heater to said solids separator a multi-compartment oil/water separator tank mounted adjacent to said solids separator, means for feeding said heated waste oil free of solids from said solids separator to said oil/water separator, a plurality of vertical transverse walls within said oil/water separator tank dividing said separator tank into sealed side by side compartments, said transverse walls including weir openings of increasing depth at their upper ends in a direction away from the end of said oil/water separator tank adjacent said solids separator; whereby, water separates by gravity from said heated oil and accumulates sequentially within the bottom of the oil/water separator tank compartments, and separated, heated oil flows over the weir openings of said vertical oil/water separator tank transverse walls sequentially towards the most downstream compartment remote from the solids separator, and means for selectively removing accumulated water from the bottoms of all of said tank compartments and oil skimmmer means within said most downstream separator tank compartment at the level above the separated water to remove water free heated oil therefrom.

2. A compact waste oil cleaning apparatus as claimed in claim 1, wherein said oil burner fired heater,, said elongated oil/water separator tank, and said solids separator are mounted side by side and in that order along said platform from one end to the other, and wherein said oil burner fired heater includes a reheat pipe in loop form projecting from the heater central chamber into at least the most downstream compartment of the oil/water separator tank to facilitate start-up and to maintain the desired temperature of oil after separation of solids and water.

3. The compact oii cleaning apparatus as claimed in claim 2, wherein said elongated horizontal platform comprises a tractor trailer chassis, a solids storage tank is mounted to the end of the platform bearing the solids separator, beneath the solids separator functioning as an operator platform, the elongated oil/water separator tank is of modified parallelpiped form having a flat top wall extending horizontally over the major length of the tractor trailer chassis, a catwalk extends the length of the oil/water separator tank across the top wall of the oil/water separator tank to one side thereof, openings are provided within the top wall of the oil/water separator tank to the side of the catwalk and aligned with specific compartments within said separator tank for access thereto, and lids are hinged to said top wall at respective openings, said lids being sized to said openings to cover the openings, and being accessible from the catwalk.

4. The compact waste oil cleaning apparatus as claimed in claim 3, wherein said oil/water separator tank comprises laterally spaced vertical sidewalls, a horizontal top wall spanning across the tops of the vertical sidewall and being joined at opposite sides thereto, said sidewalls at their bottoms including inwardly inclined portions, a bottom wall narrower than the top wall and being joined along its lateral side edges to the ends of said inwardly inclined sidewall portions and end walls at opposite ends of said separator tank being joined at the upper edges to the horizontal top wall and along their side edges to said sidewall, said end walls including inwardly inclined lower portions being joined along their side edges to the inwardly inclined portions of said sidewalls and at their bottoms to the ends of said bottom wall such that said compartments have inclined wall portions at their bottoms facilitating drainage of water from the bottoms of said oil/water separator tank compartments and wherein said means for selectively removing accumulated water from the bottoms of said tank compartments comprise water outlet pipes projecting into respective oil/water separator tank compartments through said bottom wall, and being commonly joined at their opposite ends to a water manifold pipe extending longitudinally of said oil/water separator tank, and a flat vortex prevention plate mounted horizontally above the bottom wall of said wall separator tank within each compartment overlying the outlet hole formed by each water outlet pipe to ensure indirect water flow out of the bottom of the oil/water separator tank compartment at the hole locations.

5. The compact waste oil cleaning apparatus as claimed in claim 4 wherein, a manually operable shut-off valve is carried by each water removal pipe intermediate of said separator tank and said common manifold water manifold pipe, said valves comprise pivotable valve actuator for opening and closing said valves, a control stand is mounted on said chassis on said operator platform and carries a plurality of pivotable levers corresponding to the actuators of said valves, and cable and pulley means operatively couple said levers with said valve actuators such that, an operator may selectively open and close said valves to drain the water selectively from said compartments through said water manifold pipe.

6. A compact waste oil cleaning apparatus as claimed in claim 4 wherein, rods are vertically mounted to the sides of the compartment separator walls within said oil/water separator tank for free vertical movement, said rods bear spherical floats at their lower ends immersible within water and flags at their upper ends, said flags being projectable outwardly from the top wall of the oil/water separator tank whereby, upon accumulation of a predetermined volume of water within said compartments, the operator is appraised of the extent of water separated from the oil and accumulating within a given compartments.

7. The compact waste oil cleaning apparatus as claimed in claim 1 wherein said oil burner fired heater comprises a metal tank including a circular bottom wall closing off the bottom of said cylindrical outer side wall, said inner cylindrical side wall, is raised from said bottom wall, is closed off by a false bottom wall and forms with said circular bottom wall, a cylindrical oil chamber, a waste oil supply pipe leading to said cylindrical oil chamber and opening to the center of that chamber, a vertical spiral strip is carried within said cylindrical oil chamber to form a spiral oil flow passage from the center towards the periphery of said chamber, said horizontal chamber being open at its periphery to the annular chamber formed intermediate of the outer and inner cylindrical side walls, said helical strip means comprises a helical strip wound vertically within said annular chamber and defining a closed helical flow path for the oil within the annular chamber, the top of said heater inner vertical cylindrical side wall terminating at some height below that of the outer cylindrical side wall, conical top walls mounted to said inner and outer vertical cylindrical side walls and being spaced from each other to form an inclined conical chamber therebetween forming inclined oil flow path toward the axis of the central chamber at the upper end thereof, and a vertical stack projecting through said conical chamber from said central chamber to the exterior and functioning as a flue for escape of the products of combustion.

8. The compact waste oil cleaning apparatus as claimed in claim 7, wherein said burner comprises a horizontal axis cylindrical burner projecting through the inner and outer vertical cylindrical sidewalls adjacent the bottom wall of said heater and opening tangentially into said inner chamber, said fire box is cylindrical and wherein a refractory material covers the interior surface of the fire box, the heater bottom wall and a portion of the inside surface of the inner cylindrical sidewall to facilitate retention of heat and heat exchange between products of combustion and the oil within the annular chamber without damage to said waste oil.

9. A compact waste oil cleaning apparatus as claimed in claim 1, wherein said means for pumping oil through said heater comprises an oil inlet pipe for supplying waste oil to said apparatus, and opening to the bottom of said heater, a pump within said oil inlet pipe for positively pumping of oil into said heater, and wherein a heated waste oil supply pipe extends across the oil/water separator tank, and connects at one end to the annular chamber bearing said oil at the top of the heater, and is open at its opposite end above said solids separator for gravity discharge of the heated waste oil onto said solids separator, a return loop pipe is connected at one end to said heated oil supply pipe adjacent the end opening above the solids separator and has its opposite end opening interiorly to said annular chamber of said heater bearing said oil, an oil pond return pipe is connected at one end to said return loop pipe and being disposed, intermediate of said solids separator and said oil/water separator tank and extending at least to one side of said chassis, and wherein a first cut-off valve is provided within said heated waste oil supply pipe downstream of the connection of the return loop pipe, a second cut-off valve is provided within said return loop pipe downstream of the connection between said pond return pipe and said return loop pipe and wherein, a third cut-off valve is carried by said pond return pipe adjacent its connection to the return loop pipe such that selectively, waste oil may be heated by said heater and delivered via said heated waste oil supply pipe to said solids separator, heated and fed in a return loop through said heated waste oil supply pipe and said return loop pipe, or heated by said heater and returned to said pond through said waste oil supply pipe and said pond return pipe by selective operation of said cut-off valves depending upon the viscosity of the pond waste oil available to the waste oil cleaning apparatus.

* * * * *